United States Patent
Ho

(10) Patent No.: US 8,077,643 B2
(45) Date of Patent: Dec. 13, 2011

(54) SYSTEMS AND METHODS FOR SYNCHRONIZING AUDIO SIGNALS OF A COMMUNICATION DEVICE

(75) Inventor: Min-Ching Ho, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 547 days.

(21) Appl. No.: 12/262,186

(22) Filed: Oct. 31, 2008

(65) Prior Publication Data
US 2009/0147769 A1 Jun. 11, 2009

(30) Foreign Application Priority Data
Oct. 31, 2008 (CN) .................................... 12262186

(51) Int. Cl.
*H04B 3/20* (2006.01)

(52) U.S. Cl. ....................... 370/289; 370/350; 379/406.1
(58) Field of Classification Search ......................... None
See application file for complete search history.

(56) References Cited

U.S. PATENT DOCUMENTS

| | | | |
|---|---|---|---|
| 2003/0093459 A1* | 5/2003 | Dowling et al. | 709/201 |
| 2005/0129224 A1* | 6/2005 | Piket et al. | 379/406.01 |

* cited by examiner

*Primary Examiner* — Jianye Wu
(74) *Attorney, Agent, or Firm* — Altis Law Group, Inc.

(57) ABSTRACT

A method for synchronizing audio signals of a communication device includes determining whether a downlink thread or a uplink thread is running, pausing the downlink thread or the uplink thread, and executing the downlink thread or the uplink thread by directing a scheduler. A system and storage medium with instructions for performance of the system also provided.

12 Claims, 6 Drawing Sheets

SYSTEMS AND METHODS FOR SYNCHRONIZING AUDIO SIGNALS OF A COMMUNICATION DEVICE

BACKGROUND

1. Field of the Invention

Embodiments of the present disclosure relate to synchronizing audio signals, and particularly to a system and method for synchronizing audio signals of a communication device.

2. Description of Related Art

Wireless communication systems are primarily designed for bidirectional audio communication. In a wireless communication system with voice service, a communication device, such as a mobile phone, needs to simultaneously process audio signals in two different directions such as uplink and downlink. The uplink data are audio signals recorded by a receiver microphone of the communication device, while the downlink data are audio signals transmitted from the other end of the wireless communication network to the receiver, and further played back by a speaker of the receiving communication device.

In a communication system with voice services, echoing is a common quality-degrading occurrence. An echo occurs when sound created at the originating end reflects back to and is received by at the originating end. In a wireless communication system, a major source of echoing is sound played by the speaker of the receiving communication device reflecting back to the originating end via the microphone at the receiving end. Essentially, the uplink audio signals include the downlink audio signals embedded therein. Therefore, it is necessary to estimate the echo by an echo cancellation program (ECP), eliminate the estimated echo from the received audio signals at the receiver microphone, and then transmit outgoing audio signals to the other end of the wireless communication network. In other words, the ECP finds the downlink audio signals portion in the uplink audio signals, that is the echo, and removes or suppresses that portion of the signal.

The ECP is commonly designed and implemented in hardware or software. The ECP implemented in hardware in a communication device removes echo portion from received audio signals at the microphone. The hardware implementation, while providing a good solution to echo cancellation, concurrently increases hardware cost and volume, impacting portability of the communication device.

Implementation of the ECP via software, while effectively removing the echo portion from received audio signals at a receiver microphone, requires uplink audio signals to be processed before the downlink audio signals since. The uplink audio signal is recorded by the receiver microphone of the communication device, the downlink audio signal is recorded by the communication device at the other end, and the downlink audio signal is further played back after transmission via the communication network. Effectively, the ECP software records the downlink audio signals as the echo portion to storage and removes the echo portion from the uplink audio signals. The communication device consequently requires two processors to support the implementation, one processor specifically processing the ECP, allowing simultaneous processing of the echo at the receiver microphone, and the other processor driving main operating system (OS) functionality. The requirement for an additional processor, as before, increases hardware cost and impacts portability of the communication device.

Therefore, what is needed is a system and method for synchronizing the audio signals of a communication device removing the downlink audio signals from the uplink audio utilizing a single processor.

SUMMARY

A method for synchronizing audio signals of a communication device includes, upon initiation of voice communications, determining whether a downlink thread (DT) is running, determining whether an uplink thread (UT) is running, pausing the UT if the DT is not running and the UT is running, and pausing the DT and the UT if both the DT and the UT are running. After detection and removal of DT content from the UT by the ECP, the DT is resumed according to instructions from a scheduler, and the UT is resumed according to instructions from a scheduler.

Other objects, advantages and novel features will become more apparent from the following detailed description of certain embodiments of the present disclosure when taken in conjunction with the accompanying drawings, in which:

DETAILED DESCRIPTION OF CERTAIN INVENTIVE EMBODIMENTS

Figure 1:
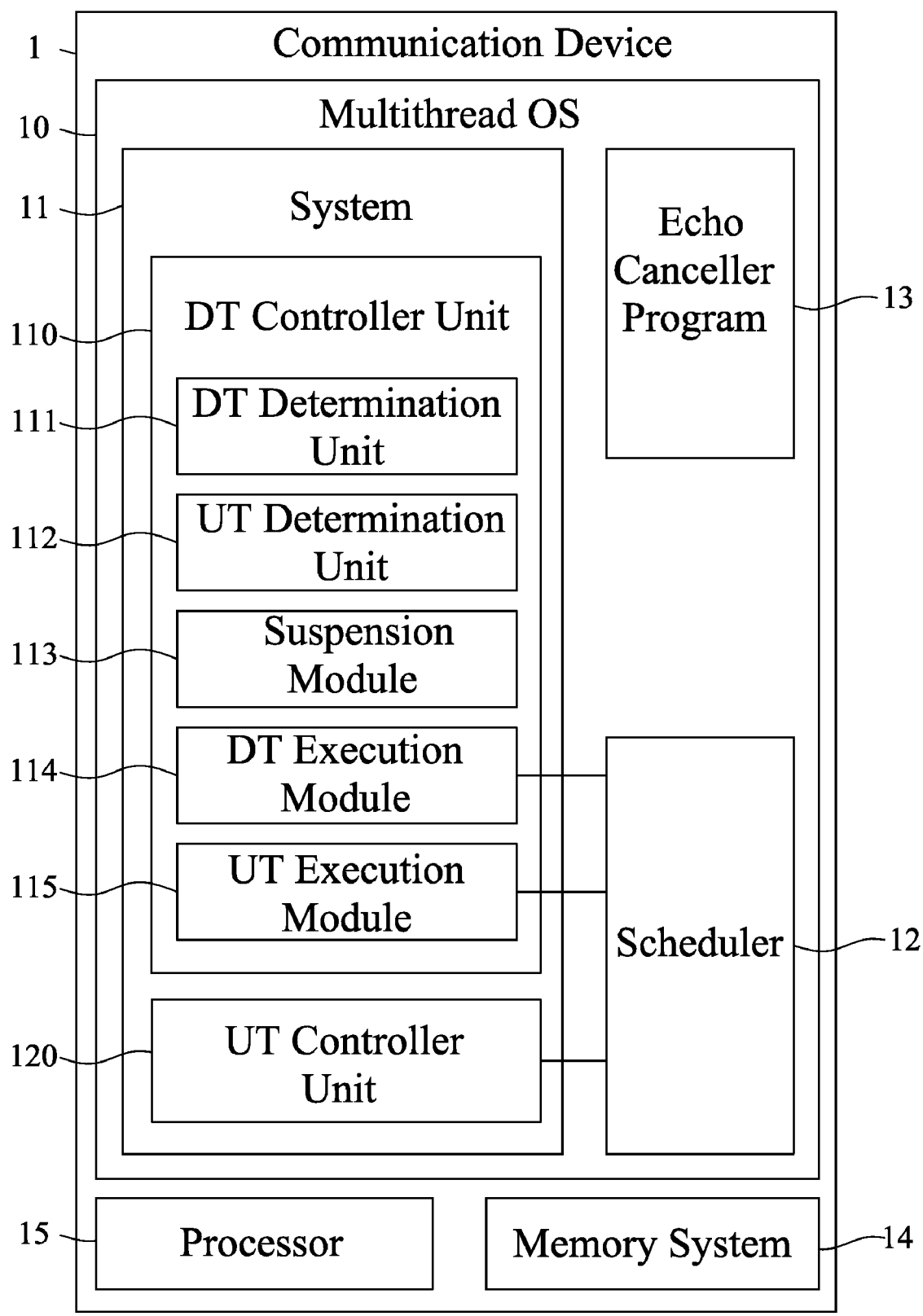
FIG. 1 is a block diagram of one embodiment of a system for synchronizing audio signals of a communication device.

All of the processes described may be embodied in, and fully automated via, software code modules executed by one or more general purpose computers or processors as depicted in FIG. 1. The code modules may be stored in any type of computer-readable medium or other storage device. Some or all of the methods may alternatively be embodied in specialized computer hardware or communication apparatus.

FIG. 1 is a block diagram of one embodiment of a system 11 for synchronizing audio signals of a communication device 1. The communication device includes a multithread operating system (OS) 10, a memory system 14, and a processor 15. The multithread OS 10 is embodied in the communication device 1. The multithread OS 10 may be any kind of multithread OS, such as Windows@ Mobile OS, the Symbian@ OS, Linux@ OS or any other OS applicable to the communication device. In the embodiment, the multithread OS 10 includes the system 11, a scheduler 12, and an echo cancellation program (ECP) 13. Additionally, the communication device 1 may further include one or more specialized or general purpose processors such as the processor 15 for executing the multithread OS 10, the system 11, the scheduler 12, and the ECP 13.

The scheduler 12 is configured for allocating time slice(s) of the processor 15 to a thread with a highest priority. In the multithread OS 10, uplink audio signals are processed by an uplink thread (UT) and downlink audio signals by a downlink thread (DT). The scheduler 12 drives the UT and/or the DT to process corresponding audio signals. The uplink audio signals are recorded by a receiver microphone of the communication device 1, and the downlink data is received by the communication device 1 from a wireless communication network.

The ECP 13 is configured for removing the downlink audio signals from the uplink audio signals. The system 11 and the ECP 13 may run directly on the multithread OS 10. In other embodiments, the system 11 and the ECP 13 may be embedded into an Interrupt service thread (IST) of an audio driver running upon the multithread OS 10.

The memory system 14 is configured for storing downlink and uplink audio signals. The memory system 14 may be a hard disk drive, a flash drive, or any other kind of memory storage systems.

The system 11 is configured for synchronizing the UT and the DT, and then synchronizing the uplink audio signals and the downlink audio signals to enable the ECP 13 to eliminate the downlink audio signals from the uplink audio signals. The system 11 includes a downlink thread controller unit (DTCU) 110 and an uplink thread controller unit (UTCU) 120. The UTCU 120 is configured for controlling the UT when the ECP 13 is processing the uplink audio signals. When there is no UT running, the UTCU 120 drives the scheduler 12 to allocate the time slice(s) of the processor 15 of the communication device 1 to execute the UT. The DTCU 110 is configured for resetting the UT while the ECP 13 is processing the downlink audio signals to synchronize the UT and the DT. The DTCU 110 includes a downlink thread determination module (DTDM) 111, an uplink thread determination module (UTDM) 112, a suspension module 113, a downlink thread execution module (DTEM) 114, and an uplink thread execution module (UTEM) 115. In one embodiment, the processor 15 of the communication device 1 may execute the DTCU 110, the UTCU 120, the DTDM 111, the UTDM 112, the suspension module 113, the DTEM 114, and the UTEM 115. Additionally, the communication device 1 may include one or more specialized or general purpose processors, such as the processor 15, for executing the modules 111, 112, 113, 114, 115.

The DTDM 111 is configured for determining if the DT is running.

The UTDM 112 is configured for determining if the UT is running.

The suspension module 113 is configured for pausing the UT, if the UT is running and the DT is not running, or pausing both the UT and the DT if both are running.

The DTEM 114 is configured for executing the DT by directing the scheduler 12 to allocate the time slice(s) of the processor 15 to the DT, after pausing the UT or pausing both the UT and the DT. The DTEM 114 is also configured for executing the DT by directing the scheduler 12 to allocate the time slice(s) of the processor 15 to the DT, if neither of the UT or DT is running.

The UTEM 115 is configured for executing the UT by directing the scheduler 12 to allocate the time slice(s) of the processor 15 of the communication device 1 to the UT.

Figure 2:
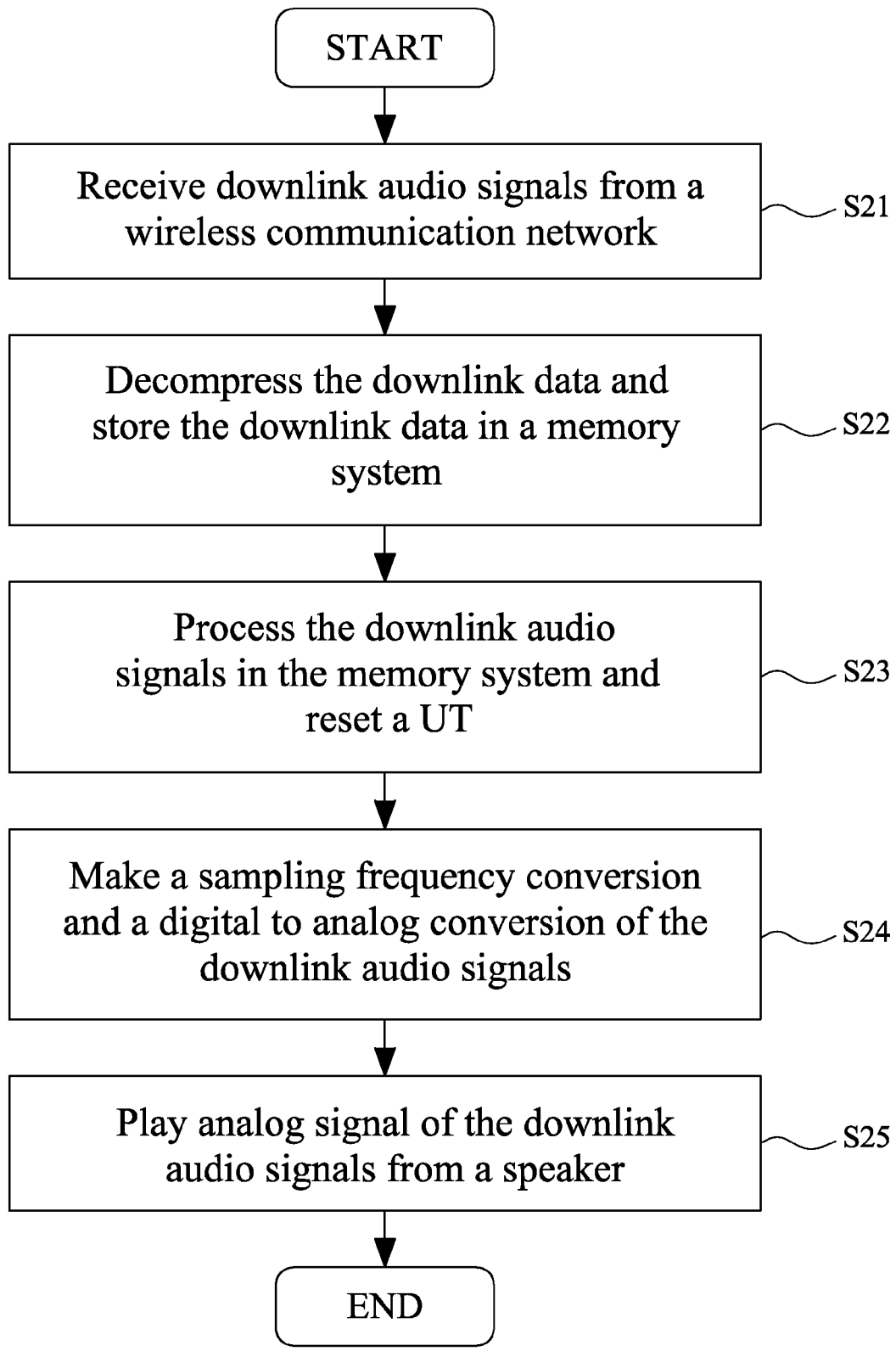
FIG. 2 is a flowchart of a downlink processing component of the embodiment of a system for synchronizing audio signals of FIG. 1.

FIG. 2 is a flowchart of a downlink processing component of the method for synchronizing audio signals of FIG. 1. Depending on the embodiment, additional blocks may be added, others deleted, and the ordering of the blocks may be changed. First, in block S21, the communication device 1 receives downlink audio signals transmitted from the wireless communication network.

In block S22, the communication device 1 decompresses the downlink audio signals, and stores the downlink audio signals in the memory system 14.

In block S23, the ECP 13 processes the downlink audio signals stored in the memory system 14, and synchronizes the Uplink Thread (UT) and the Downlink Thread (DT) by resetting of the UT by the DTCU 110. In the embodiment, the ECP 13 establishes an echo cancellation model of the downlink audio signals, and further removes the downlink audio signals from the uplink audio signals accordingly. Furthermore, the downlink audio signals are divided into small data blocks sequentially stored in the memory system 14 and further processed by the ECP 13. The DTCU 110 resets the UT once every time a single data block of the downlink audio signals is processed.

In block S24, the downlink audio signals processed by the ECP 13 undergo a sampling frequency conversion and a digital to analog conversion. In block S24, the downlink audio signals are further converted from 8 kHz to the 44.1 kHz sampling frequency, in one embodiment, normally employed by speaker and receiver microphone of communication devices, preventing speaker output audio waveform distortion.

In block S25, the analog signal is transmitted by the speaker of the communication device 1.

Figure 3:
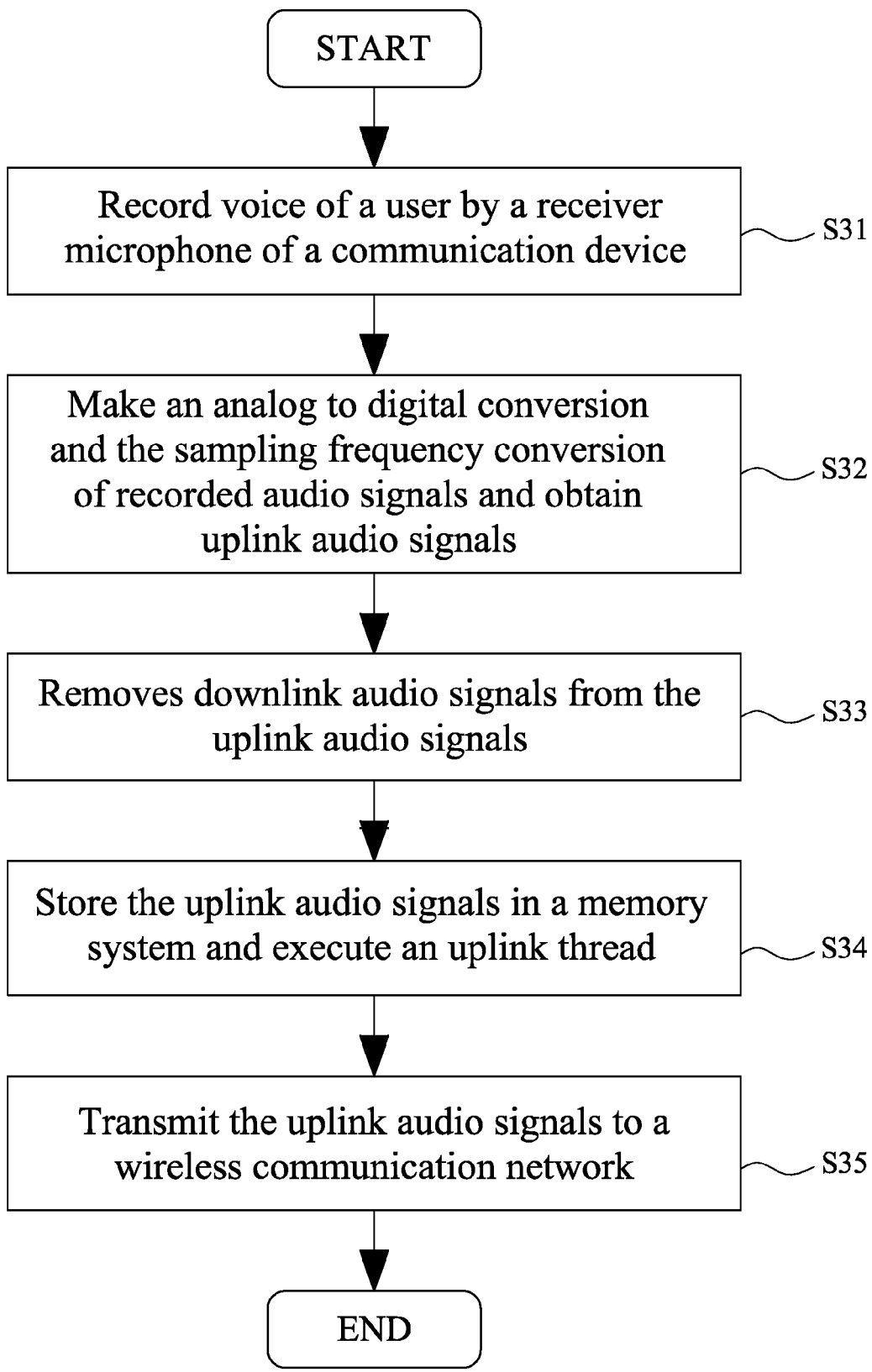
FIG. 3 is a flowchart of an uplink processing component of the embodiment of a system for synchronizing audio signals of FIG. 1.

FIG. 3 is a flowchart of an uplink processing component of an embodiment of a method for synchronizing audio signals of FIG. 1. Depending on the embodiment, additional blocks may be added, others deleted, and the ordering of the blocks may be changed. First, in block S31, incoming audio data is recorded by the receiver microphone of the communication device 1.

In block S32, the uplink audio signals are obtained by converting recorded data from analog to digital data and the sampling frequency thereof. The downlink audio signals are further converted from 8 kHz to the 44.1 kHz sampling frequency, in one embodiment, normally employed by speaker and receiver microphone of communication devices, preventing speaker output audio waveform distortion.

In block S33, the ECP 13 removes the downlink audio signals from the uplink audio signals according to the echo cancellation model established in block S23.

In block S34, the uplink audio signals, processed by the ECP 13, are stored in the memory system 14, and the UTCU 120 executes the Uplink Thread (UT) by directing the scheduler 12 to allocate the time slice(s) of the processor 15 of the communication device 1 to the UT, if the UT is not running. In the embodiment of the present disclosure, the uplink audio signals are divided into small data blocks sequentially stored in the memory system 14 after processing by the ECP 13. The UTCU 120 resets the UT every time a single data block of the UT is stored in the memory system 14. The detailed flowchart of resetting of the UT by the UTCU 120 is described in FIG. 5.

In block S35, the uplink audio signals are compressed and further transmitted to the other end of the wireless communication network.

Figure 4A:
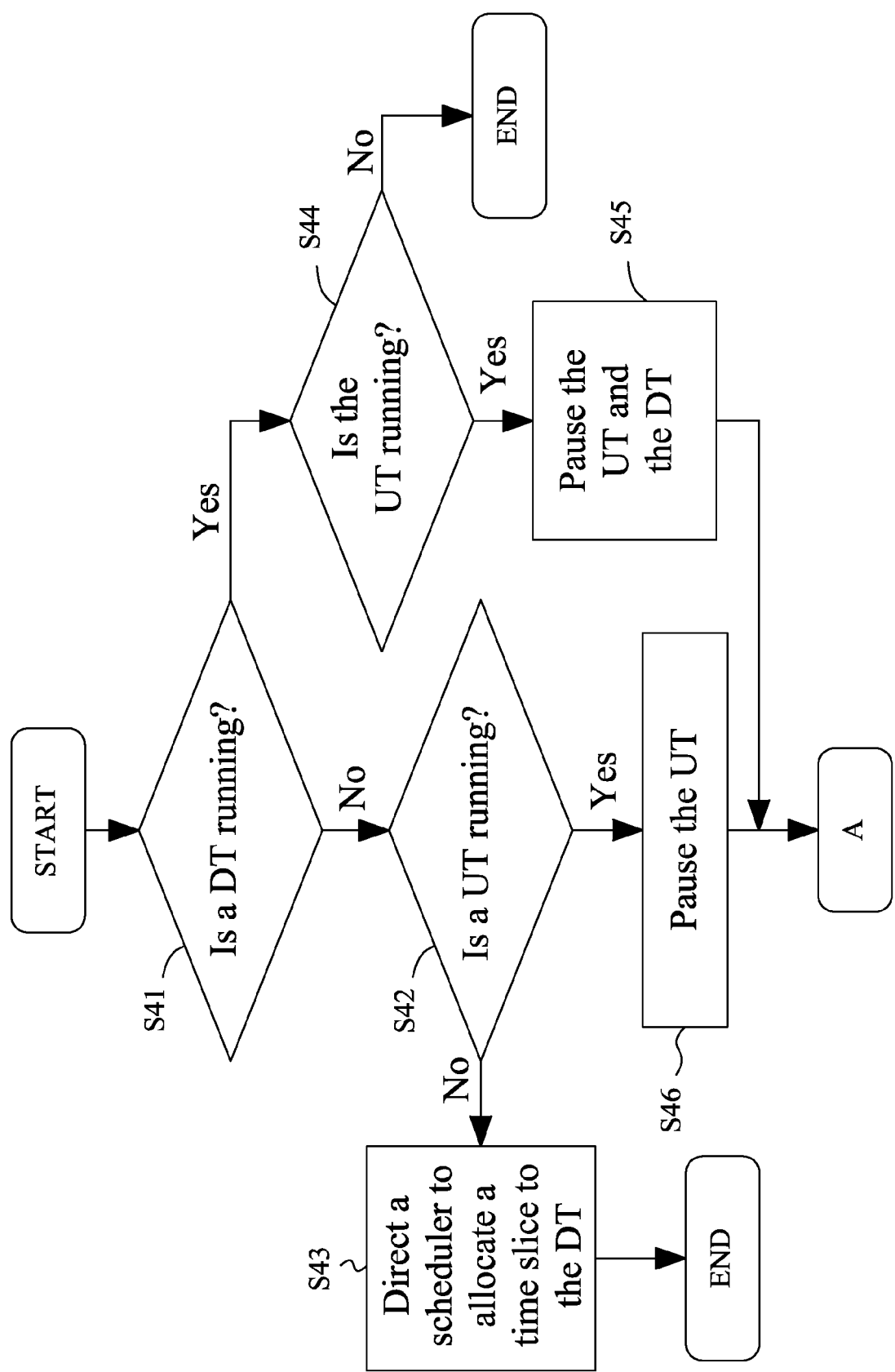
FIG. 4 is a flowchart of one embodiment of a method for synchronizing audio signals of the communication device.
Figure 4B:
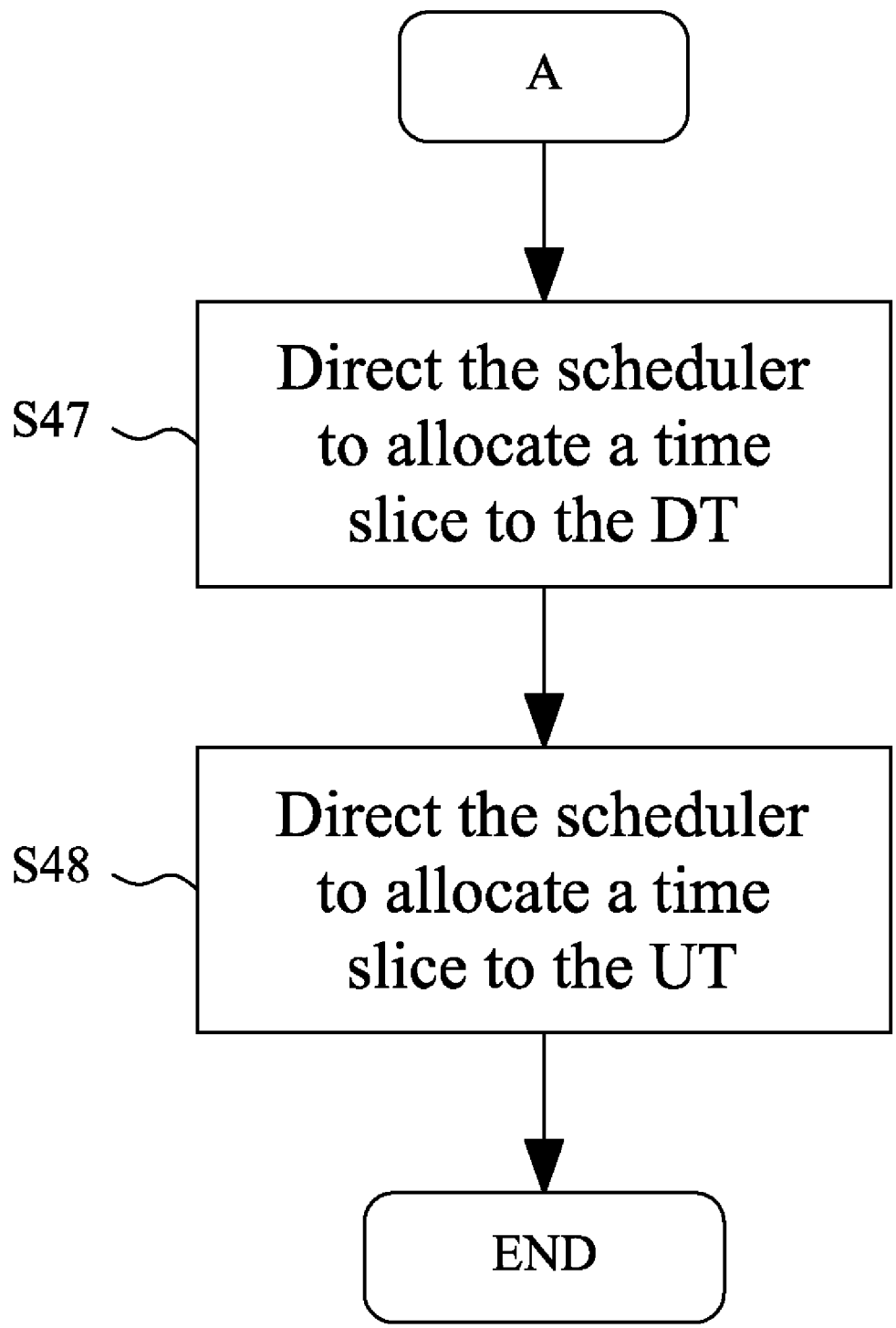

FIG. 4 is a flowchart of one embodiment of a method for synchronizing audio signals of the communication device. Depending on the embodiment, additional blocks may be added, others deleted, and the ordering of the blocks may be changed.

In block S41, the DTDM 111 determines if the Downlink Thread (DT) is running.

If the DT is not running, in block S42, the UTDM 112 determines if the Uplink Thread (UT) is running.

In block S43, the DTEM 114 executes the DT by directing the scheduler 12 to allocate the time slice(s) of the processor 15 of the communication device 1 to the DT if the UT is not running, and the process is completed.

If the DT is running in block S41, in block S44, the UTDM 112 determines if the UT is running.

In block S45, the suspension module 113 pauses both the UT and the DT if the UT is running in block S44, and then the procedure goes to block S47.

In block S46, the suspension module 113 pauses the UT if the UT is running in block S42.

In block S47, the DTEM 114 executes the DT by directing the scheduler 12 to allocate the time slice(s) of the processor 15 of the communication device 1 to the DT.

In block S48, the UTEM 115 executes the UT by directing the scheduler 12 to allocate the time slice(s) of the processor 15 of the communication device 1 to the UT, and the process is completed.

If the UT is determined to be not running in block S44, the procedure is completed.

Figure 5:
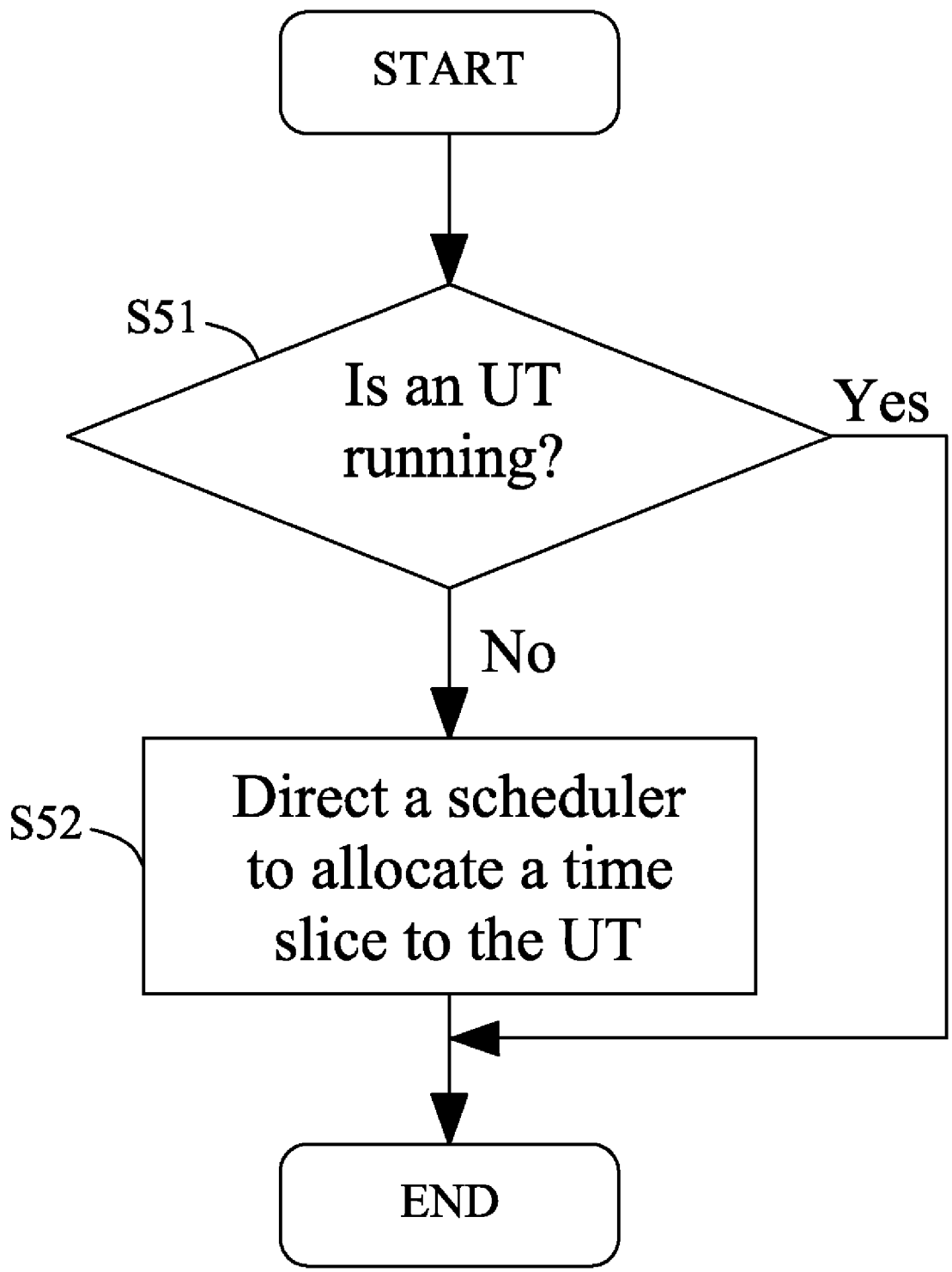
FIG. 5 is a flowchart of controlling an uplink thread of the method for synchronizing audio signals of FIG. 4.

FIG. 5 is a flowchart of controlling an uplink thread of the method for synchronizing audio signals of FIG. 4. The flowchart is a sub-flowchart of a step of resetting of the UT by the UTCU 120 as shown in block S34 of FIG. 3. Depending on the embodiment, additional blocks may be added, others deleted, and the ordering of the blocks may be changed.

In block S51, the UTDM 112 determines if the Uplink Thread (UT) is running. If the UT is running, the procedure is completed.

If the UT is not running, in block S52, the UTCU 120 executes the UT by directing the scheduler 12 to allocate the time slice(s) of the processor 15 of the communication device 1 to the UT.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for synchronizing audio signals of a communication device, the system comprising:
    a downlink thread controller unit (DTCU) configured for synchronizing an uplink thread (UT) and a downlink thread (DT) by resetting the UT while an echo cancellation program (ECP) is processing downlink audio signals, the DTCU comprising:
    a downlink thread determination module (DTDM) configured for determining if the DT is running;
    an uplink thread determination module (UTDM) configured for determining if the UT is running;
    a suspension module configured for pausing the UT, if the UT is running and the DT is not running, and pausing the UT and the DT if both the UT and the DT are running;
    a downlink thread execution module (DTEM) configured for executing the DT by directing a scheduler to allocate at least one time slice of a processor of the communication device to the DT after pausing the UT or pausing both the UT and the DT; and
    an uplink thread execution module (UTEM) configured for executing the UT by directing the scheduler to allocate the time slice of the processor to the UT;
    an uplink thread controller unit (UTCU) configured for executing the UT by directing the scheduler to allocate the time slice of the processor to the UT if the ECP is processing uplink audio signals;
    a memory system for storing downlink and uplink audio signals; and
    at least one processor executing the UT, the DT, the UTDM, the DTDM, the UTEM, the DTEM, the scheduler, the UTCU, the suspension module, and the ECP to synchronize audio signals of a communication device and reduce downlink audio signals from uplink audio.

2. The system as claimed in claim 1, wherein the DTEM is further configured for executing the DT if neither the DT nor the UT are running.

3. The system as claimed in claim 1, wherein the uplink audio signals are recorded by a receiver microphone of the communication device.

4. The system as claimed in claim 1, wherein the downlink audio signals are received by the communication device from a wireless communication network.

5. A computer-implemented method for synchronizing audio signals of a communication device, the method comprising:
    synchronizing an uplink thread (UT) and a downlink thread (DT) by resetting the UT while an echo cancellation program (ECP) is processing downlink audio signals, comprising:
    determining if the DT and the UT are running;
    pausing the UT if the UT is running and the DT is not running, or pausing the UT and the DT if both the UT and the DT are running;
    executing the DT by directing a scheduler to allocate at least one time slice of a processor of the communication device to the DT; and
    executing the UT by directing the scheduler to allocate the time slice of the processor to the UT; and
    executing the UT by directing the scheduler to allocate the time slice of the processor to the UT if the ECP is processing uplink audio signals.

6. The method as claimed in claim 5, wherein resetting an uplink thread further comprises executing the DT if neither the DT nor the UT are running.

7. The method as claimed in claim 5, wherein the uplink audio signals are recorded by a receiver microphone of the communication device.

8. The method as claimed in claim 5, wherein the downlink audio signals are received by the communication device from a wireless communication network.

9. A non-transitory computer-readable medium, having stored thereon instructions that, when executed by a computer, cause the computer to perform a method for synchronizing audio signals of a communication device, the method comprising:
    synchronizing an uplink thread (UT) and a downlink thread (DT) by resetting the UT while an echo cancellation program (ECP) is processing downlink audio signals, comprising:
    determining if the DT and the UT are running;
    pausing the UT if the UT is running and the DT is not running, or pausing the UT and the DT if both the UT and the DT are running;
    executing the DT by directing a scheduler to allocate at least one time slice of a processor of the communication device to the DT; and executing the UT by directing the scheduler to allocate the time slice of the processor to the UT; and executing the UT by directing the scheduler to allocate the time slice of the processor to the UT if the ECP is processing uplink audio signals.

10. The non-transitory computer-readable medium as claimed in claim 9, wherein resetting an uplink thread further comprises executing the DT if neither the DT nor the UT are running.

11. The non-transitory computer-readable medium as claimed in claim 9, wherein the uplink audio signals are recorded by a receiver microphone of the communication device.

12. The non-transitory computer-readable medium as claimed in claim 9, wherein the downlink audio signals are received by the communication device from a wireless communication network.

* * * * *